United States Patent [19]

Nagai

[11] Patent Number: 5,619,437
[45] Date of Patent: Apr. 8, 1997

[54] PARALLEL DATA COUNTER CIRCUIT

[75] Inventor: Hiroshi Nagai, Tokyo, Japan

[73] Assignee: Ando Electric Co., Ltd., Tokyo, Japan

[21] Appl. No.: 534,714

[22] Filed: Sep. 27, 1995

[30] Foreign Application Priority Data

Sep. 30, 1994 [JP] Japan .................................. 6-261734

[51] Int. Cl.⁶ .............................. G06F 7/00; G06F 15/00
[52] U.S. Cl. ............................................... 364/715.09
[58] Field of Search ..................................... 364/554, 786,
364/715.09, 787; 235/175; 375/1; 340/347;
371/29, 223; 377/29, 51

[56] References Cited

U.S. PATENT DOCUMENTS 3,711,692  1/1973  Batcher .................................. 235/175
4,189,716  2/1980  Krambeck ............................. 340/347
4,206,505  6/1980  Zorina et al. ......................... 364/554
4,488,253  12/1984 Lerouge ................................ 364/786
4,669,089  5/1987  Gahagan et al. .......................... 375/1

Primary Examiner—Paul P. Gordon
Assistant Examiner—Monica Lewis
Attorney, Agent, or Firm—Finnegan, Henderson, Farabow, Garrett & Dunner, L.L.P.

[57] ABSTRACT

A parallel data counter circuit is disclosed which is able to handle increases in the amount of parallel data and number of counts with minimal increases in circuitry. First addition circuits add n pieces of parallel data two at a time and output carry signals and storage data which are the addition results thereof. Second addition circuits add two carry signals output from the first addition circuits and output storage data which are the addition results thereof. A counter circuit calculates a final single carry signal and outputs storage data as a count result.

7 Claims, 7 Drawing Sheets

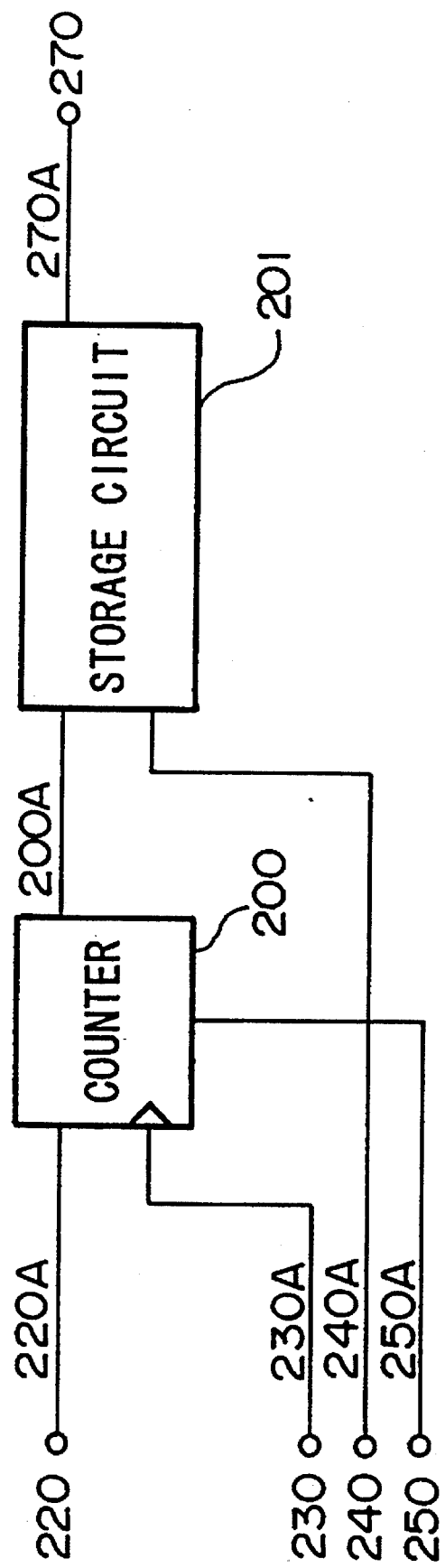

PARALLEL DATA COUNTER CIRCUIT

BACKGROUND OF THE INVENTION

1. Field of the Invention

The present invention relates to parallel data counter circuits, and more specifically, to parallel data counter circuits which calculate the total numbers of "1"'s or "0"'s in parallel data which is generated in synchronization with a clock.

2. Description of the Related Art

Hereinbelow, an example of a conventional parallel data counter circuit will be explained with reference to FIG. 6. FIG. 6 shows a parallel data counter circuit which calculates the number of "1"'s in four parallel groups of data comprising four m-bit counter circuits 6–9. The m-bit counter circuits 6–9 respectively have parallel data input terminals 20–23, and each of their input sides are connected to a clock terminal 30, a storage signal input terminal 40, and a reset terminal 50. Initially, storage data output terminals 70–73 are respectively connected to the output sides of m-bit counter circuits 6–9.

As examples of m-bit counter circuits 6–9, it is possible to use those comprising an m-bit counter 200 and a storage circuit 201 such as that shown in FIG. 7. A data input terminal 220, a clock input terminal 230 and a reset terminal 250 are connected to m-bit counter 200, while a storage signal input terminal 240 and a storage data output terminal 270 are connected to the storage circuit In the m-bit counter circuit of FIG. 7, m-bit counter 200 performs a count by means of clock signal 230A input from clock terminal 230, with data 220A input from data input terminal 220 as a control signal. In this example, m-bit counter 200 has a control structure such that the clock signal 230A counts up when the data 220A is equal to 1. The count value 200A of this m-bit counter 200 is inputted to the storage circuit 201.

In order to read out the count value for a given time, storage circuit 201 stores the count Value 200A according to a signal 240A input to the storage signal terminal 240. Then the count value 200A is output from storage data output terminal 270 as an output signal 270A. The m-bit Counter 200 is initialized when a reset signal 250A is input to reset terminal 250.

Next, the operation of a conventional parallel data counter circuit will be explained with reference to FIG. 6. Four pieces of parallel data 20A–23A which have been input to data input terminals 20–23, are respectively input to the data input terminals of m-bit counter circuits 6–9. The m-bit counter circuits 6–9 perform calculations based on clock signal 30A input from clock input terminal 30.

When reading out the results of the calculations in the parallel data counter circuit at a given time, a signal 40A in synchronization with clock signal 30A is input to storage signal input terminal 40. The signal 40A is input to the storage signal input terminals of the m-bit counter circuit 6–9. Then, each of the m-bit counter circuits 6–9 stores the calculated value for that time and outputs storage data 6A–9A. These storage data 6A–9A are output from the storage data output terminals 70–73. When a reset signal 50A is input to reset terminal 50, each m-bit counter circuit 6–9 is initialized, thereby initializing the parallel data counter circuit of FIG. 6.

Next, the procedure for calculating all of the calculation values in the parallel data counter circuit from the above-mentioned storage data will be explained. The storage data 6A–9A for a given time are equal to the calculation values of the four parallel data 20A–23A respectively. Therefore, the total calculation value of the parallel data counter circuit is 6A+7A+8A+9A.

While FIG. 6 shows an example of a quadruple parallel data counter circuit, it is possible to have an n-parallel data counter circuit provided with n m-bit counter circuits for n groups of data. Additionally, the total calculated value for such as case, when taking the calculated value for each m-bit counter circuit to be $X_n$, would be $\Sigma X_n$.

However, with conventional parallel data counter circuits, it is necessary to provide n counter circuits corresponding to n parallel data in order to calculate the total value over all of the data. For this reason, the number of counter circuits increases with the number of parallel data to be calculated, which can lead to problems with enlargement of the circuit.

Additionally, it is necessary to, increase the number of bits m for each counter circuit when increasing the count number of the counter circuit. When the bit number m of each counter circuit is increased in this way, there is a problem in that the size of the circuit could increase even further by m times for the n parallel data over the entire parallel data counter circuit.

SUMMARY OF THE INVENTION

The object of the present invention is to provide a parallel data counter circuit which is able to handle increases in the amount of parallel data or the count number with only a small increase in the size of the circuit.

In order to realize the above object, the present invention offers a parallel data counter circuit which calculates the total number of "1"'s or "0"'s in a set of parallel data, comprising k addition means, wherein k is an integer greater than 2; and wherein first addition means add said parallel data two pieces at a time and output carry signals corresponding to the additions; n-th addition means, wherein n represents every integer between 1 and k, add the carry signals output from the (n −1)th addition means two at ma time and output carry signals corresponding to the additions; k-th addition means add the carry signals output from the (k−1)th addition means two at a time and output carry signals corresponding to the additions; and counter means which calculates carry signals output from the k-th addition means.

Additionally, with the present invention, it is not necessary to provide parallel counter circuits corresponding to the parallel data number as in, the conventional examples, thereby preventing increases in the size of the circuit in response to the number of parallel data.

Furthermore, by providing a parallel data counter circuit with a single counter means which does not depend on the parallel data number, it is possible to handle the increase or decrease of the maximum count number with an increase or decrease of the bit number of the single counter means.

BRIEF DESCRIPTION OF THE DRAWINGS

FIG. 7 is a circuit diagram illustrating an example of the composition of a counter circuit used in the conventional example shown in FIG. 6.

DESCRIPTION OF THE PREFERRED EMBODIMENTS

Figure 1:
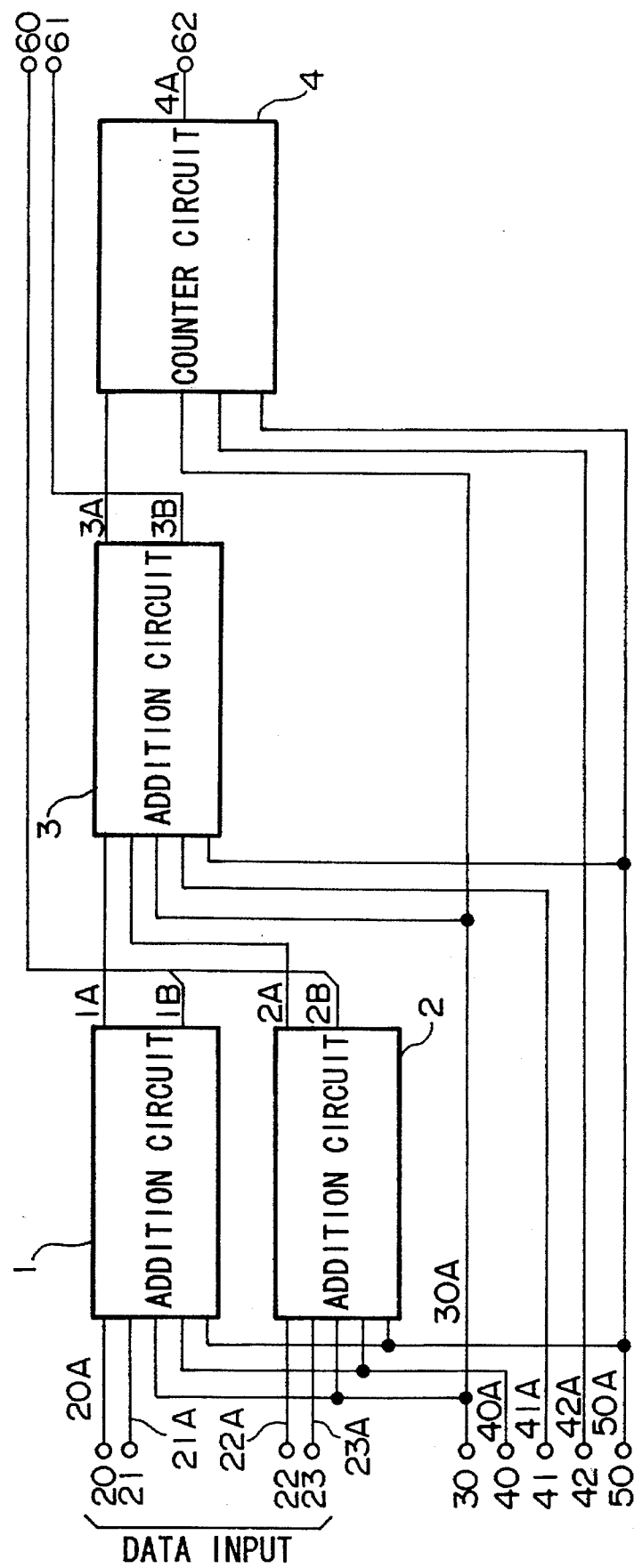
FIG. 1 is a circuit diagram illustrating an embodiment of the parallel data counter circuit according to the present invention.

Next, an example of an embodiment of the parallel data counter circuit will be explained with reference to FIG. 1. FIG. 1 shows a first addition means comprising addition circuits 1 and 2, a second addition means comprising addition circuit 3, and a counter means comprising an m-bit counter circuit 4. Additionally in FIG. 1, reference numerals 20–23 indicate parallel data terminals, reference numeral 30 indicates a clock terminal, reference numerals 40–42 indicate storage signal terminals, reference numeral 50 indicates a reset terminal and reference numerals 60–62 indicate storage data output terminals.

FIG. 1 illustrates an example of a quadruple parallel data counter circuit for calculating the number of "1"'s in quadruple parallel data, having a parallel number which is a power of two. Since m-bit counter circuit 4 of the present embodiment has the same composition as that of the conventional example, a detailed explanation will be omitted.

Figure 2:
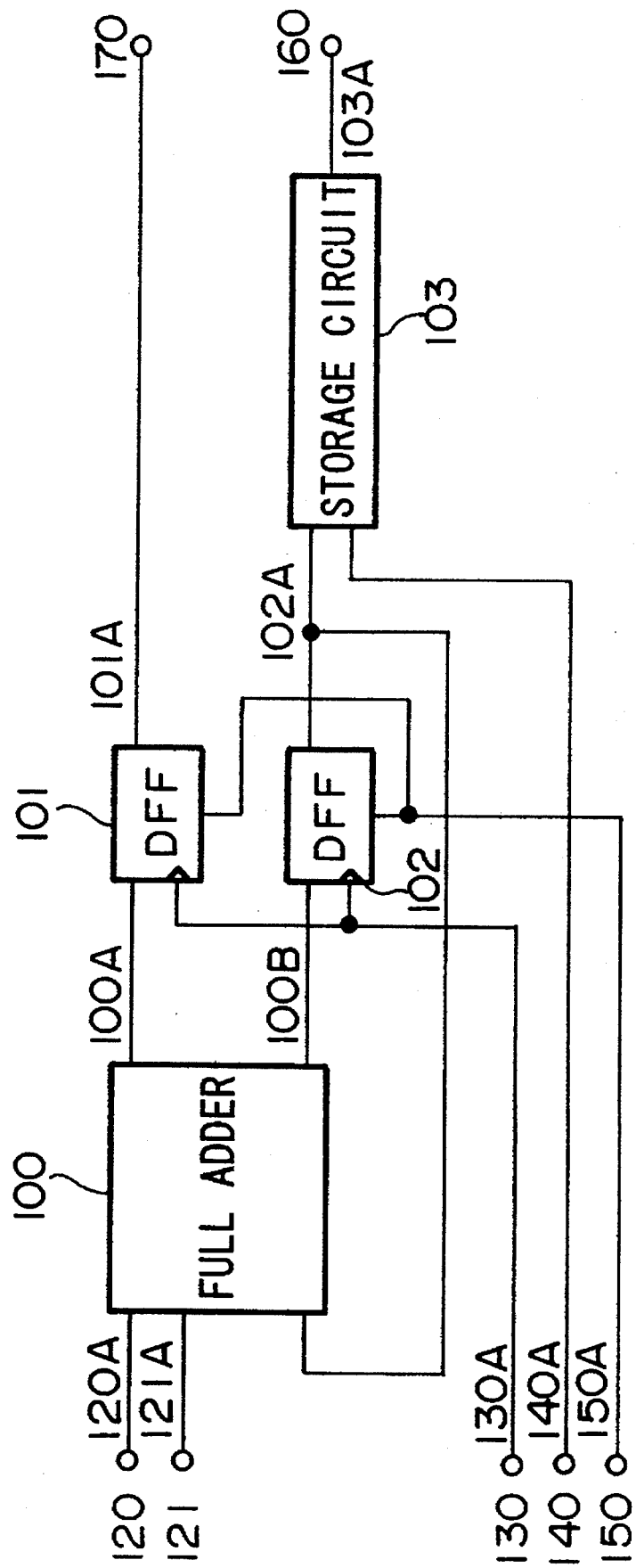
FIG. 2 is a circuit diagram illustrating an example of an addition circuit used in the embodiment shown in FIG. 1.

Next, an example of the composition of addition circuits 1–3 which are the basic component circuits of the embodiment shown in FIG. 1 will be explained with reference to FIG. 2. As shown in FIG. 2, the addition circuit comprises a full adder 100 which is an adding device, DFFs 101/102 having reset function and storage circuit 103. Additionally, reference numerals 120 and 121 indicate data input terminals, reference numeral 130 indicates a clock terminal, reference numeral 140 indicates a storage signal terminal, reference numeral 150 indicates a reset terminal, reference numeral 170 indicates a carry output terminal and reference numeral 160 indicates a storage data output terminal.

Two pieces of parallel data 120A and 121A, after being entered into data input terminals 120 and 121, are input to full adder 100 along with the addition result 102A from the previous step. The full adder 100 adds the parallel data 120A and 121A with the addition result 102A. Then, if the addition result is greater than or equal to 2, a carry signal 100A which is a signal to jump up one place is output. This carry signal 100A is input to DFF 101. The DFF 101 times the carry signal 100A with a clock signal 130A input from the clock terminal 130, and outputs carry data 101A. This carry data 101A is output from carry output terminal 170.

Additionally, full adder 100 outputs addition result 100B if the addition results in a 1 or a 3. The addition result 100B is retimed with the clock signal 130A by DFF 102. The addition result 102A retimed by DFF 102 is input to full adder 100 in order to add it with the next parallel data 120A and 121A as the addition results of the previous step.

Also, the addition result 102A is input to storage circuit 103. The storage circuit 103 stores the current addition result 102A and outputs an addition signal 103A according to a signal 140A input to storage signal terminal 140 to read out the calculation result for a given time. The addition signal 103A is output from output terminal 160. The DFF 101 and DFF 102 are initialized by inputting a reset signal 150A to reset terminal 150.

Next, the actions of the embodiment of a quadruple parallel data counter circuit shown in FIG. 1 will be explained. Of the four pieces of parallel data 20A–23A input to the data input terminals 20–23, parallel data 20A and 21A are input to addition circuit 1, while parallel data 22A and 23A are input to addition circuit 2. Then, the parallel data 20A and 21A are added at addition circuit 1 comprising the first addition means. If a carry is generated upon performing the addition, addition circuit 1 generates a carry signal 1A which has been retimed with the clock signal 30A input to clock terminal 30. In a similar manner, at addition circuit 2, the parallel data 22A and 23A are added, and if a carry is generated, then a carry signal 2A is generated.

The carry signals 1A and 2A of addition circuits 1 and 2 are input to addition circuit 3 of the second addition means. At addition circuit 3, the carry signals 1A and 2A are input and added; if a carry is generated, then a carry signal 3A which has been retimed with the clock signal 30A is generated. The carry signal 3A is input to the counter circuit 4. The counter circuit 4 counts the clock signal 30A depending on the state of the carry signal 1A.

With this parallel data counter circuit, when a calculation result is read out for a given time, a storage signal 40A in synchronization with the clock signal 30A is first input from storage signal terminal 40. Due to this storage signal 40A, addition circuits 1 and 2 comprising the first addition means store the addition results of the addition circuit at that time, and generate storage data 1B and 2B as addition results of the first addition means. These storage data 1B and 2B are output from storage data output terminal 60.

Next, a storage signal 41A in synchronization with the next clock signal 30A is input from storage signal terminal 41. Due to this storage signal, addition circuit 3, which is the second addition means, stores the addition results within the addition circuit at that time, and generates storage data 3B as the addition result of the second addition means. These storage data 3B are output from the storage data output terminal 61.

Furthermore, a storage signal 42A synchronized with the next clock signal 30A is input from the storage signal terminal 42. Due to this storage signal 42A, counter circuit 4 stores the count value for that time and generates storage data 4A as the count result of the counter. These storage data 4A are output from storage data output terminal 62. In order to initialize the parallel counter circuit of this embodiment, a reset signal 50A is input to reset terminal 50, thereby initializing addition circuits 1–3 and counter circuit 4.

Figure 3:
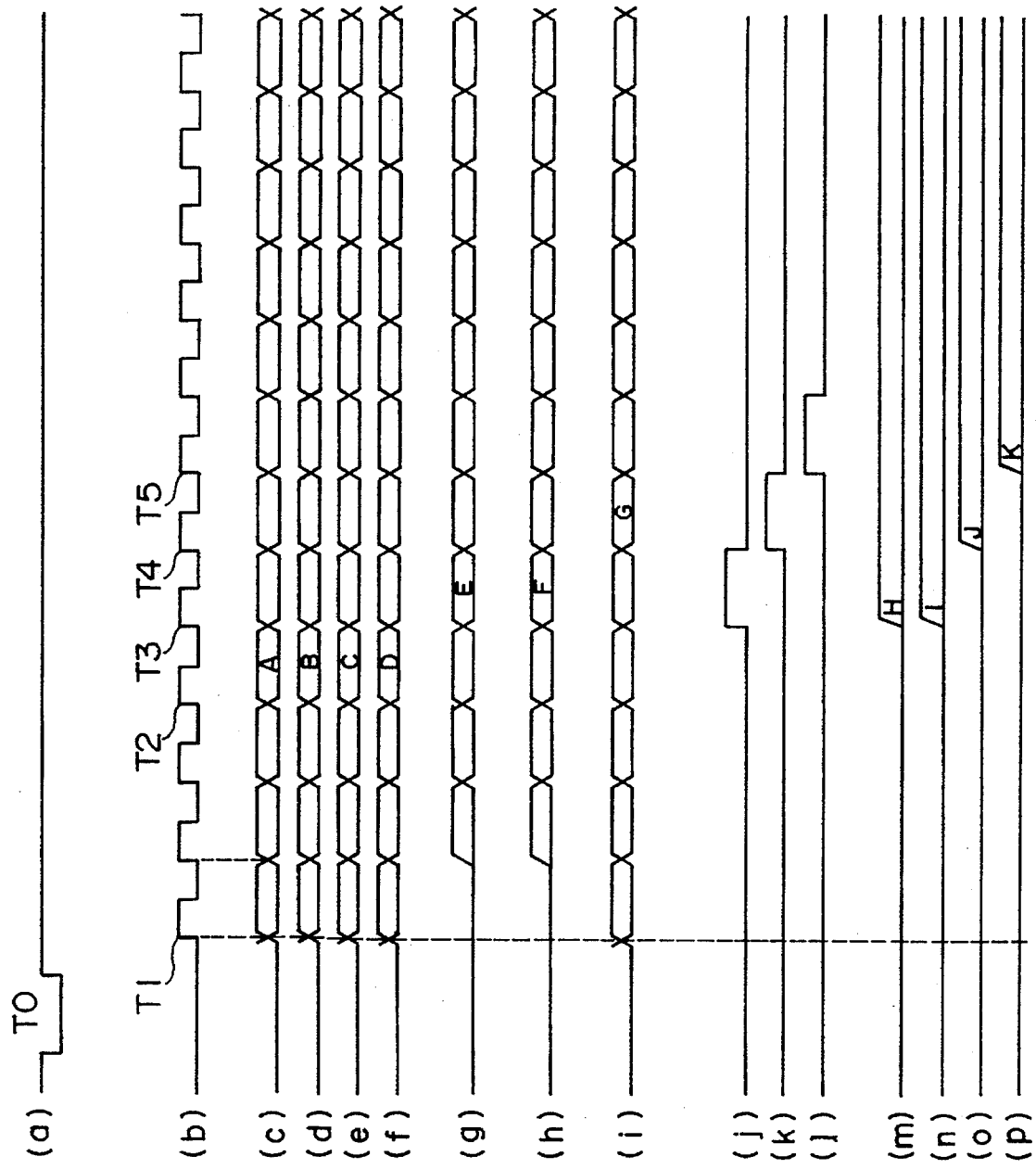
FIG. 3 is a time chart for explaining the operation of the embodiment shown in FIG. 1.

Next, the actions of the parallel data cementer circuit of the present embodiment will be explained with reference to the time chart shown in FIG. 3. FIG. 3 shows a series of waveform diagrams, in which (a) indicates a reset signal 50A, (b) indicates a clock signal 30A, (c) indicates parallel data 20A, (d) indicates parallel data 21A, (e) :indicates parallel data 22A, (f) indicates parallel data 23A, (g) indicates carry signal 1A of addition circuit 1, (h) indicates carry signal 2A of addition circuit 2, (i) indicates carry signal 3A of addition circuit 3, (j) indicates storage signal 40A, (k) indicates storage signal 41A, (l) indicates storage signal 42A, (m) indicates storage data 1B which is the addition result of addition circuit 1, (n) indicates a storage data 2B which is the addition result of addition circuit 2, (o) indicates storage data 3B which is the addition result of addition circuit 3 and (p) indicates storage data 4A which is the count value of counter circuit 4.

As shown in FIG. 3, the counter circuit is first initialized by the reset signal 50A at time T0. Next, at time T1, the clock signal 30A and the four parallel data 20A–21A 22A and 23A are input and their calculation s begun.

Here it will be assumed that the parallel data 20A–23A input at some time T2 are the data "A", "B", "C" and "D" respectively. In this case, addition circuit 1 adds "A" and "B" to generate "E" as the carry signal 1A, and addition circuit 2 adds "C" and "D" to generate "F" as the carry signal 2A, both carry signals synchronized with the clock at time T3. Then, addition circuit 3 receives the carry signals 1A and 2A, adds "E" and "F", and generates "G" as the carry signal 3A synchronized with the clock at time T4. Counter circuit 4 then receives "G" as the carry signal 3A and performs a count with the clock at time T5.

Additionally, the addition result of the input data "A", "B", "C" and "D" is retimed by a clock, as shown in the example of an addition circuit in FIG. 2. Therefore, when the storage signal 40A is entered at time T3, addition circuit 1 stores the addition result "H" of "A" and "B", and addition circuit 2 stores the addition result "I" of "C" and "D". Then, when the storage signal 41A is entered a, time T4, addition circuit 3 stores the addition result "J" of "E" and "F". Next, when the storage signal 42A is entered at time, T5, counter circuit 4 stores the result "K" of the count of "G" which is the carry signal 3A.

In this way, by inputting the storage signals 40A–42A, the contents of the counter calculated from the data "A", "B", "C" and "D" at time T2 are stored.

Figure 4:
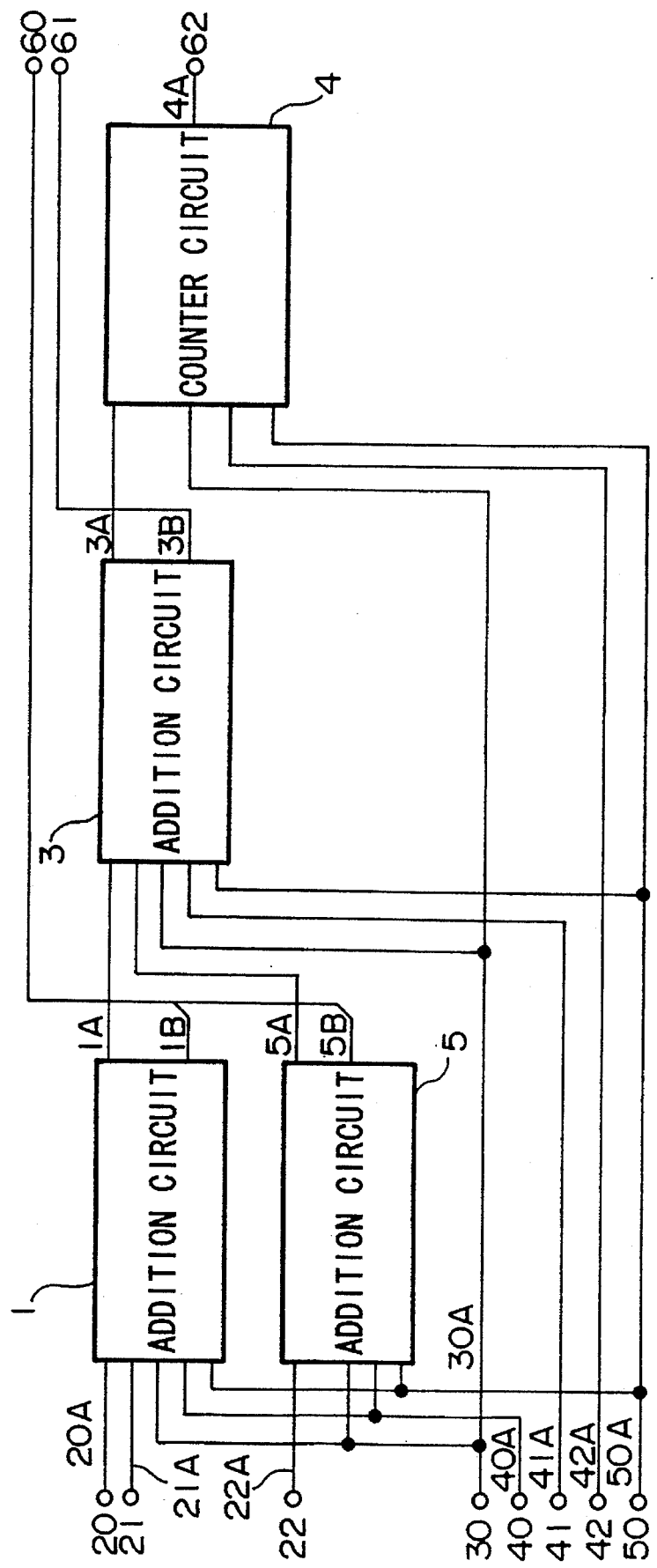
FIG. 4 is a circuit diagram illustrating another embodiment of a parallel data counter circuit or the present invention.

Next, an embodiment of the parallel data counter circuit of the present invention for the case in which the parallel number is not a power of 2 will be explained with reference to FIG. 4. FIG. 4 shows an example of a triple parallel data counter circuit for counting the number of "1"s in triple parallel data.

FIG. 4 shows a first addition means comprising addition circuits 1 and 5, second addition means comprising addition circuit 3 and counter means comprising m-bit counter circuit 4. Reference numerals 20–22 indicate three parallel data terminals, reference numeral 30 indicates a clock terminal, reference numerals 40–42 indicate storage signal terminals, reference numeral 50 indicates a reset terminal and reference numerals 60–62 indicate storage data output terminals. Since addition circuit 1, addition circuit 3 and m-bit counter circuit 4 are identical to those shown in FIG. 1, their explanation will be omitted.

Addition circuit 5 is a 1-bit addition circuit which is necessary when the parallel number or the carry number is not a multiple of two. The addition circuit 5 performs additions with input parallel data 22. Additionally, this addition is performed so as to serially generate a carry signal 5A when there are two 1's in the parallel data 22.

Figure 5:
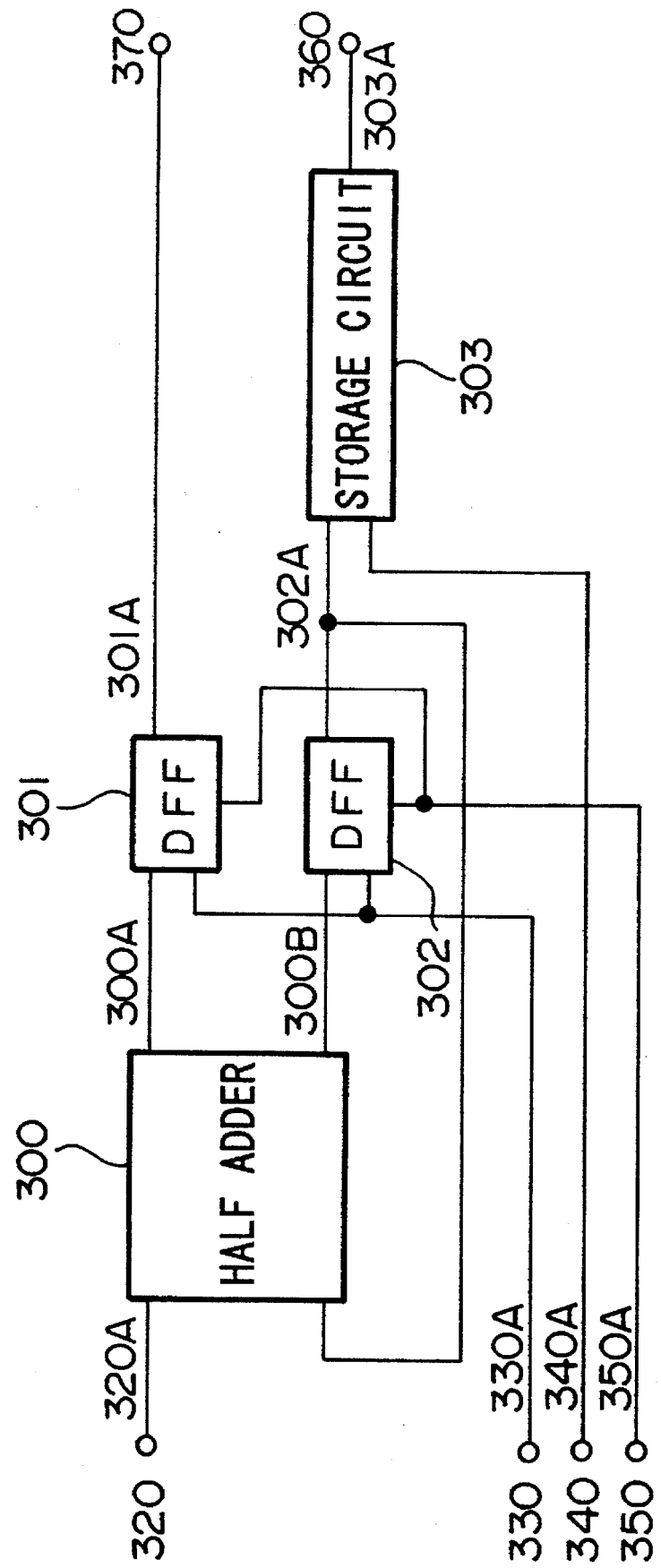
FIG. 5 is a circuit diagram illustrating an example of an addition circuit used in the embodiment shown in FIG. 4.
Figure 6:
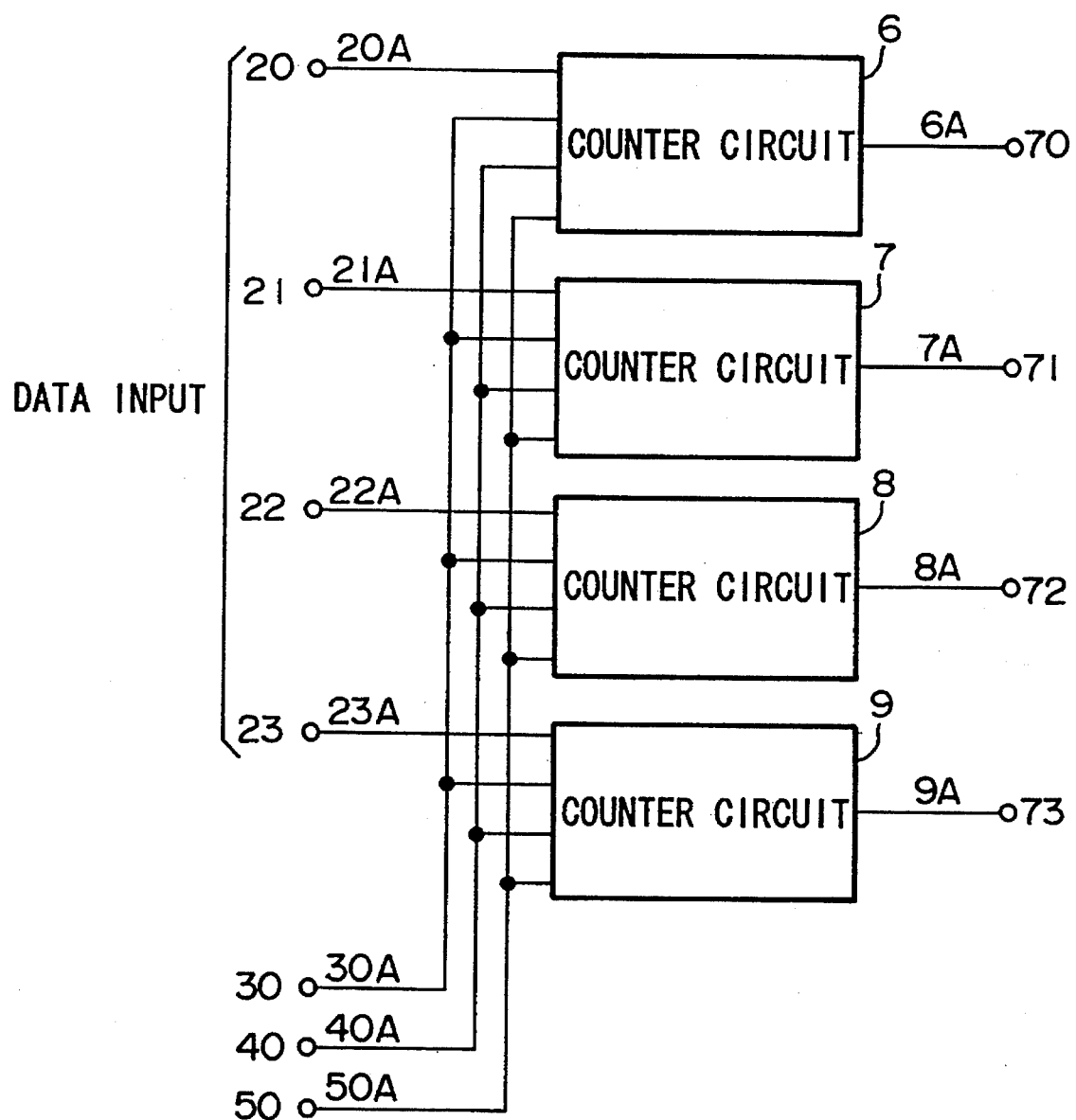
FIG. 6 is a circuit diagram illustrating a conventional parallel data counter circuit.

Next, the composition of addition circuit 5 will be explained with reference to FIG. 5. In FIG. 5, the addition device comprises a half adder 300, DFFs 301/302 with resets, and a storage circuit 303. Reference numeral 320 indicates a data input terminal, reference numeral 330 indicates a clock terminal, reference numeral 340 indicates a storage signal terminal, reference numeral 350 indicates a reset terminal, reference numeral 370 indicates a carry output terminal and reference numeral 360 indicates a storage data output terminal.

With the addition circuit of FIG. 5, the data 320A input to data input terminal 320 and the addition result 302A of the previous step are input to half adder 300. Half adder 300 adds data 320A and addition result 302A. Then, if the addition result is greater than or equal to 2, then a carry signal 300A which is a signal to move up a place is output. The carry signal 300A is input to DFF 301. DFF 301 retimes the carry signal 300A with a clock signal 330A input to clock terminal 300, and outputs carry data 301A. These carry data are output from carry output terminal 370.

Additionally, half adder 300 outputs 300B if the addition result is either 1 or 3. The addition result 300B is retimed with the clock signal 330A at DFF 302i. The addition result 302A retimed by DFF 302 is input to half adder 300 for adding with the next data series signal 320A as the addition result of the previous step.

Additionally, the addition signal 302A is also input to storage circuit 303. Storage circuit 303 stores the current addition result 302A according to the signal 340A input to storage signal terminal 340 for reading out the calculation result for a given time, and outputs the addition signal 303A. The addition signal 303A is output from output terminal 360. DFF 301 and DFF 302 are initialized by inputting a reset signal 350A to reset terminal 350.

Next, the method by which the calculation value is calculated from the storage data in the parallel data counter circuit will be explained.

In the case of the parallel data counter circuit of FIG. 1, addition circuit 1 and addition circuit 2 independently perform calculations, while in the parallel data counter circuit of FIG. 4, addition circuit 1 and addition circuit 5 independently perform calculations. For this reason it is necessary to calculate storage data 1B and 2B for the parallel data counter circuit of FIG. 1 and storage data 1B and 5B for the parallel data counter circuit of FIG. 4. Then, assuming the value calculated by the first addition means to be x1, x1=1B+2B for the parallel data counter circuit of FIG. 1 and x1=1B+5B for the parallel data counter circuit of FIG. 4.

Additionally, addition circuit 3 comprising the second addition means adds the carry signals of addition circuit 1 and addition circuit 2 of the first addition means for the parallel data counter circuit of FIG. 1, and adds the carry signals of addition circuit 1 and addition circuit 5 for the parallel data counter circuit of FIG. 4. Carry signals 1A and 2A of addition circuit 1 comprising the first addition means in FIG. 1 and carry signals 1A and 5A of addition circuit 1 in FIG. 4 are generated when the addition result of the parallel data is 2. For this reason, the storage data 3B of addition circuit 3 comprising the second addition means has the value of "2". Assuming the value calculated by the second addition means to be x2, then x2=2* 3B.

Counter circuit 4 counts according to a carry signal 3A from addition circuit 3 comprising the second addition means. The carry signal 3A of addition circuit 3 comprising the second addition means is generated when the addition result of the carry signals 1A and 5A of addition circuits 1 and 5 comprising the first addition means is "2". This occurs when the addition result of counter circuit 4 is "4". Therefore, counter circuit 4 performs a count whenever the addition result is 4, and the storage data 4A of counter circuit 4 has the value "4". Assuming the value calculated by counter circuit 4 is x3, then x3=4* 4A. Thus, the total calculation value is their sum, so the total calculation value =x1+x2+x3. In an n-parallel data counter comprising k steps of addition circuits, when assuming the result of the first addition means to be "a" the result of the second addition means to be "b", the result of the third addition means to be "c" and the value of the last counter to be "y", then the total calculation value =$2^0*\Sigma a+2^1*\Sigma b+2^2*\Sigma c \ldots +2^{k}*$ y.

In order to calculate the Size of the circuit, the size of a circuit corresponding to a single DFF is taken as one unit.

Then, taking full adder 100 of FIG. 2 to be 2 units, DFFs 101 and 102 to be 1 unit each and storage circuit 103 to be 1 unit, each addition circuit 1–3 in FIG. 1 has 5 units.

Additionally, taking half adder 300 of the 1-bit addition circuit of FIG. 5 to be 2 units, DFFs 301–302 to be 1 unit each and storage circuit 303 to be 1 unit, addition circuit 5 of FIG. 4 has 5 units.

Then, assuming m-bit counter 200 and m-bit storage circuit 201 comprising the m-bit counter circuit in FIG. 7 each have m units, m-bit counter circuit 4 of FIG. 1 and m-bit counter circuits 5–8 of FIG. 7 are each composed of 2 * m units. Therefore, in the parallel data counter circuit of the conventional example, n*2*m units of circuit are required On the other hand, in the parallel data counter circuit according to the present invention, if there are n pieces of parallel data, the number of circuits necessary for the first addition means would be n/2 of the addition circuits of FIG. 2 when n is an even number, and (n–1)/2 of the addition circuits in FIG. 2 and one of the 1-bit addition circuits in FIG. 5 when n is an odd number Additionally if the number of addition circuits composing the first addition means is $n_1$, then the second addition means requires $n_1/2$ of the addition circuits of FIG. 2 if $n_1$ is an even number, and $(n_1-1)/2$ of the addition circuits of FIG. 2 and one of the 1-bit addition circuits of FIG. 5 if $n_1$ is odd.

In this way, if the number of addition circuits for the (K–1)-th addition means is $n_{K-1}$, then $n_{K-1}/2$ of circuits of FIG. 2 are required if $n_{K-1}$ is an even number, and $(n_{K-1}-1)/2$ of the addition circuits of FIG. 2 and one of the 1-bit addition circuits of FIG. 5 are required if $n_{K-1}$ is an odd number.

In this case, both the addition circuit of FIG. 2 and the 1-bit addition circuit of FIG. 5 have 5 units of circuitry. An m-bit counter circuit is necessary in addition to the above-mentioned addition circuit. Therefore, in the counter circuit for n pieces of parallel data arranged according to the present invention, the amount of circuitry required is equal to (the total number of addition circuits)*5+2*m units of circuitry.

For example, when quadruple parallel data are calculated by 8-bit counters, the conventional parallel data counter circuit would require 4*2*8=64 units of circuitry. In contrast, the parallel data counter circuit of the present invention is able to be put into practice with only (4/2+2/2)*5+2*8=31 units of circuitry.

Furthermore, when the count number is increased from 8 bits to 9 bits, while the conventional example requires an increase of 4*2*9–64=8 units of circuitry, the present invention requires only ((4/2+2/2)*5+2*9)–31=2 additional units of circuitry.

Next, an example of the calculation of the size of a parallel data counter circuit when quintuple parallel data are calculated by 8-bit counters will be explained. In this case, the conventional example would have 5*2*8=80 units of circuitry. However, according to the present invention, only ((5–1)/2+1+(3–1)/2+1+2/2)*5+2*8=46 units of circuitry are required.

What is claimed is:

1. A parallel data counter circuit which calculates a total number of 1's or 0's in a set of parallel data, comprising:

k addition means, where k is an integer greater than 2, including 1st through k-th addition means, the 1st addition means add said parallel data two pieces at a time and output carry signals corresponding to the additions, n-th addition means of said k addition means, where n represents every integer between 1 and k, add the carry signals output from (n–1)th addition means two at a time and output carry signals corresponding to the additions, the k-th addition means add the carry signals output from (k–1)th addition means two at a time and output carry signals corresponding to the additions; and counter means for calculating the carry signals output from the k-th addition means, and for outputting calculation result as a calculation of the total number of 1's or 0's in the set of parallel data.

2. A parallel data counter circuit according to claim 1, wherein said 1st addition means output one addition result and one carry signal for each addition of two pieces of parallel data, and 2nd through the k-th addition means output one addition result and one carry signal for each addition of two carry signals.

3. A parallel data counter circuit according to either claim 1 or 2, wherein each of the 1st through k-th addition means has an addition circuit which adds carry signals over a time series when the number of parallel data or the number of carry signals is odd.

4. A parallel data counter circuit according to claim 3, wherein each of said addition circuits of the 1st through k-th addition means comprises:

a full adder circuit or a half adder circuit;

means for retiming carry signals from said full adder circuit or said half adder circuit;

means for retiming addition results from said full adder circuit or said half adder circuit; and means for storing said addition results after retiming.

5. A parallel data counter circuit according to either claim 1 or claim 2, wherein the addition results of the 1st through k-th addition means are multiplied by $2^0$ through $2^{k-1}$, respectively, the calculation value of said counter is multiplied by $2^k$, and a total sum is taken as the total number of 1's or 0's in said parallel data.

6. A parallel data counter circuit according to claim 3, wherein the addition results of the 1st through k-th addition means are multiplied by $2^0$ through $2^{k-1}$, respectively, the calculation value of said counter is multiplied by $2^k$, and a total sum is taken as the total number of 1's or 0's in said parallel data.

7. A parallel data counter circuit according to claim 4, wherein the addition results of the 1st through k-th addition means are multiplied by $2^0$ through $2^{k-1}$, respectively, the calculation value of said counter means is multiplied by $2^k$, and a total sum is taken as the total number of 1's or 0's in said parallel data.

* * * * *

UNITED STATES PATENT AND TRADEMARK OFFICE
CERTIFICATE OF CORRECTION

PATENT NO. : 5,619,437
DATED : April 08, 1997
INVENTOR(S) : Hiroshi NAGAI

It is certified that error appears in the above-indentified patent and that said Letters Patent is hereby corrected as shown below:

Claim 1, column 8, line 14, after "outputting", insert --a--.

Signed and Sealed this

Eighth Day of July, 1997

Attest:

BRUCE LEHMAN

Attesting Officer

Commissioner of Patents and Trademarks